Nov. 2, 1943.     R. B. McKINNIS     2,333,190
APPARATUS FOR EXTRACTING JUICE FROM FRUITS AND VEGETABLES
Original Filed Dec. 6, 1939
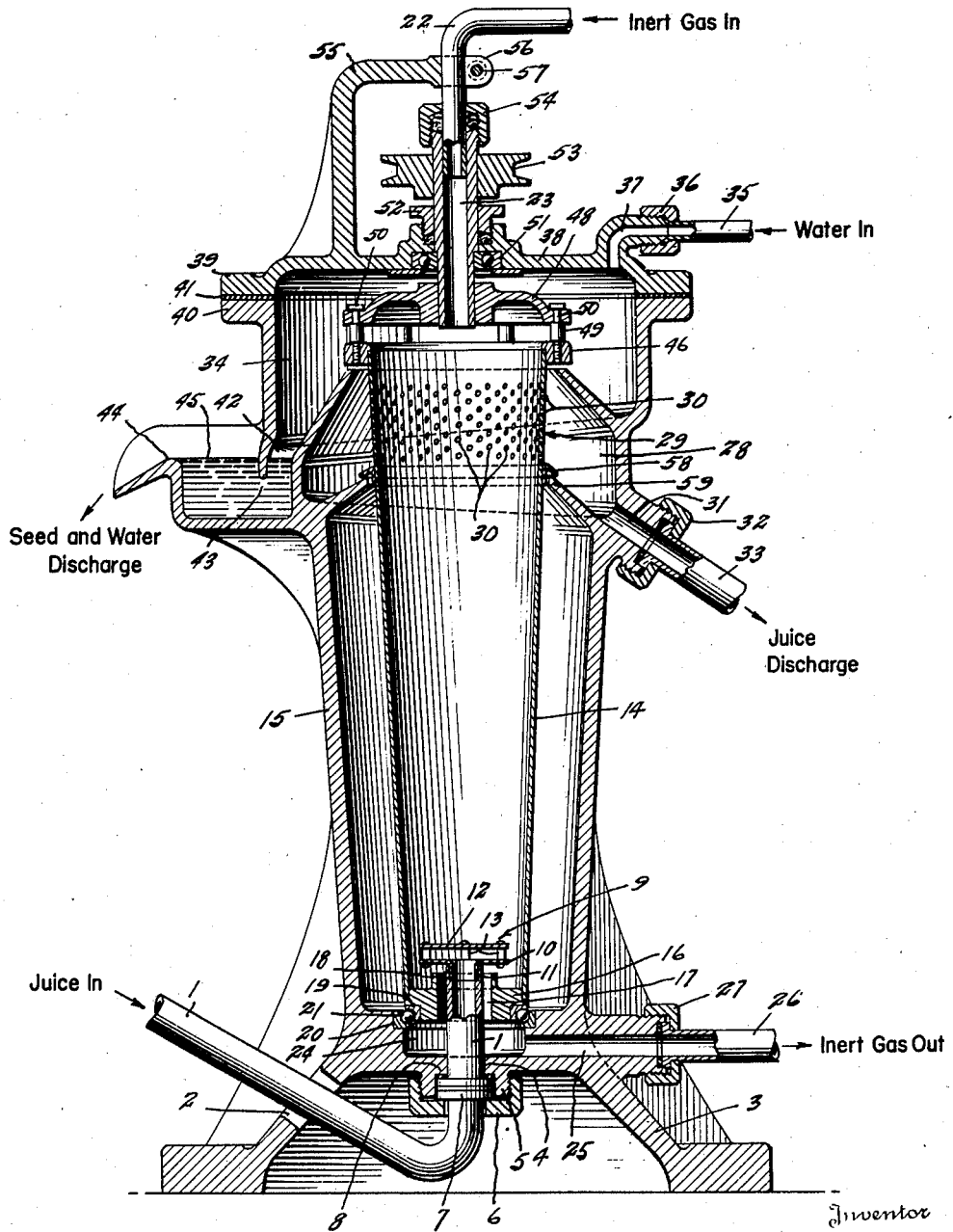
Inventor
RONALD B McKINNIS
By Semmes, Keegin & Semmes
Attorneys Patented Nov. 2, 1943

2,333,190

UNITED STATES PATENT OFFICE 2,333,190

APPARATUS FOR EXTRACTING JUICE FROM FRUITS AND VEGETABLES

Ronald B. McKinnis, Winter Haven, Fla., assignor, by mesne assignments, to Ronald B. McKinnis, doing business as McKinnis Foods, Winter Haven, Fla.

Original application December 6, 1939, Serial No. 307,897, now Patent No. 2,299,553, dated October 20, 1942. Divided and this application December 15, 1939, Serial No. 309,491

7 Claims. (Cl. 210—66)

This invention relates to an apparatus for purging liquid of objectionable gas, and in particular to an apparatus for purging fruit juices from atmospheric oxygen.

This present application is a division of my co-pending application Serial No. 307,897 filed December 6, 1939, now issued as Patent No. 2,299,553 dated Oct. 20, 1942, directed to the method.

An object of the invention is to provide an apparatus for purging fruit juices of atmospheric oxygen.

Another object of the invention is to provide an apparatus which is simple to construct, and easy to repair and replace.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

The single figure is a sectional view taken through the centrifuge apparatus which I employ in my process.

Referring to the drawing, the purging is carried out in the machine shown in that drawing. The juice is fed to the machine through a pipe 1 which is adapted to pass through an aperture 2 provided in a base casting 3. The pipe 1 passes through an aperture 4 formed in the bottom at the center of the base casting 3. A fluid tight fit is provided by screwing on to an extension 5 of the base casting 3 a cap 6 which is adapted to press a collar 7 formed on the pipe 1 against a fluid-tight compression packing 8.

The pipe 1 extends upwardly into the center of the centrifuge at the bottom thereof, and is provided at its upper end with a juice deflector 9. The deflector comprises a flanged fitting 10 which has a downwardly extending section 11 that fits into the upper end of the juice pipe 1. Above this flanged fitting 10 is a parallel plate 12 which is held spaced from the flanged fitting 10 by spacer elements 13. The arrangement is such that the juice flowing through pipe 1 and discharged at the end thereof will strike the plate 12 and be discharged laterally in a film against the inner surface of a tapered rotating element 14.

The tapered rotating element 14 is adapted to rotate within a main body section 15 which may be integrally cast with the base 3. The lower end of the conical rotating element 14 is provided with a fitting 16 having a central aperture 17 through which is adapted to pass the juice pipe 1. Formed on the fitting 16 is an upwardly extending collar 18 which extends up near the bottom surface of the flanged fitting 10, thus preventing juice from flowing through the aperture 17.

The fitting 16 carries at its lower end a ball race 19. A ball race 20 is fitted into the base 3, and the conical rotating element 14 is adapted to rotate on balls 21 held between the ball races 19 and 20.

There is a space between the outer surface of the tapered rotating element 14 and the section 15 of the body through which purging inert gas can pass, though the main volume of gas is adapted to pass downwardly in the rotating element 14 from top to bottom on the inside of rotating element 14.

Inert gas enters the centrifuge through an inert gas pipe 22 which discharges into a hollow shaft 23 which directs the stream of inert gas into the top of the conical member 14. The inert gas, such as carbon dioxide or nitrogen, or a mixture of the two, passes downwardly in the rotating element 14 and is discharged through the aperture 17 formed in the fitting 16, and thence into a collecting chamber 24, and out through a port 25 formed in the base 3. The port 25 connects with an inert gas discharge pipe 26, which is held to the nozzle by means of a suitable gas-tight fitting indicated generally by the numeral 27. A juice discharge chamber is formed in the body casting above the section 15. This chamber is indicated by the numeral 28. The chamber lies adjacent an upper section 29 of the tapered rotating member 14 which is provided with apertures 30 through which the juice passes into the juice chamber 28. From thence it is discharged through a nipple 31 which is attached by means of a suitable liquid-tight fitting 32 in a juice discharge line 33.

Adjacent the top of the mechanical rotating element 14, which is the expanded end of that element, is a seed collecting chamber 34 formed in the body casting into which the seeds and larger particles of the extracted fruit are adapted to be discharged. In order to flush out the seeds from the seed collecting chamber 34, water is fed through a pipe 35 joined by a suitable fitting 36 to a nozzle 37 formed on the cover plate 38 for the seed collecting chamber 34. The cover plate 38 is provided with a flange 39 which fits on a corresponding flange 40 formed on the seed collecting chamber 34.

Between the flanges 39 and 40 is the suitable packing 41. The two flanges are held together, compressing a packing 41 between them to provide a fluid-tight fit. These flanges may be held together by bolts or other suitable means, not shown.

The seed collecting chamber 34 is provided with a discharge chute 42 which feeds into a water seal 43 formed above the section 15 of the body casting. The water seal 43 has a discharge chute 44 over which the water, seeds and large particles are discharged. The discharge chute 42 has its lower end lying below the surface 45 of the water forming the water seal 43, thus preventing access of atmospheric oxygen into the centrifuge. Water passing into the seed chamber 34 through pipe 35 flushes out the seeds and large particles in the juice which, by centrifugal action, are forced out over the top of the rotating conical member 14.

The top of the rotating conical member 14 is provided with a ring 46 which is sweated into place on the end of the member 14, or otherwise suitably attached. This ring 46 forms a flange for the upper end of the rotating element 14. Mounted above the ring 46, is a driving disc 48 which is held in spaced relation to the ring 46 by means of spacers 49 that fit over connecting bolts 50 joining the drive rotating element 14 and the driving disc 48. The space between the members 46 and 48 permits the seeds and large particles discharged from the upper end of the rotating member 14 to be discharged into the seed collecting chamber 34.

The driving disc 48 is rotated by means of the hollow shaft 23 which is keyed or otherwise attached at its lower end into a central aperture formed in the disc 48. The hollow shaft 23 is suitably journalled in a ball bearing support indicated generally by the numeral 51, and a packing gland construction indicated generally by the numeral 52, gives a fluid-tight fit between the shaft 23 and the cover 38 of the seed collecting chamber 34.

Fixed to the shaft 23 is a pulley 53 adapted to be driven by a belt from some suitable source of power (not shown) to rotate the shaft 23 and hence to impart rotary motion through the fittings 48 and 46 to the rotating member 14.

The inert gas inlet line 22 fits within the hollow shaft 23, and a suitable packing gland construction 54 permits rotation of the shaft 23 without permitting escape of inert gas discharged from the line 22 into the centrifuge. The inert gas inlet pipe 22 is held in position by means of a bracket construction 55 formed on the cover plate 38. The split end 56 of the bracket 55 is held by means of a bolt construction 57 firmly around the pipe 22 to hold it in position.

The rotating member 14 is provided with a downwardly extending baffle 58 which is adapted to overlap the inner periphery of the bottom 59 of the juice collecting chamber 28. This construction prevents the juice from flowing down into the chamber formed between the outside of the rotating member 14 and the body section 15.

In operation the conical member 14 is rotated by the pulley 53. Juice to be purged is admitted through the juice pipe 1 and is discharged in a film on the inner surface of the member 14 by reason of the plate 12. Because the element 14 is rotating at a rapid speed, juice is distributed along the inner surface of the element 14 in a film. Because the juice is discharged at the lower end of the tapered rotating member 14, it will pass from the lower, smaller, end of the element 14 to the upper, larger, end of the element 14. During this action any lighter gaseous element as air contained in the juice will be "squeezed out" and a layer separate from the layer of juice formed on the wall of the rotating element 14. Inert gas is discharged through the inlet line 22 and the hollow shaft 23 into the top of the rotating element and passes counter-flow to the upward movement of the film of juice on the inner surface of the element 14 and passes out through aperture 17 into the chamber 24 and thence out through nozzle 25 and gas outlet line 26.

The air thus centrifugally separated from the juice is exposed to the flow of inert gas which purges the juice of substantially all of the atmospheric oxygen that the juice has collected. The seeds will be separated from the juice as it passes through the small apertures 30 and will be discharged out of the top of the rotating conical member 14 into the seed collecting chamber 34, and will be swept out by water discharged into the chamber through nozzle 37, through chute 42, into water seal 43, from whence the larger particles, the seeds and the water will then be discharged over the lip 44. The juice will be discharged through the apertures 30 into the juice collecting chamber 28, from whence the juice will be discharged through nipple 31 and juice discharge pipe 33.

I desire that my invention be limited only by the scope of the appended claims and the prior art.

I claim:

1. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therefrom, and a seed collecting chamber disposed above the juice chamber and in communication with the upper end of the basket to receive the seeds discharged from the basket.

2. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therefrom, a seed collecting chamber disposed above the juice chamber and in communication with the upper end of the basket to receive the seeds discharged from the basket, and means to prevent access of air into the seed chamber.

3. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therefrom, a seed collecting chamber disposed above the juice chamber and in communication with the upper end of the basket to receive the seeds discharged from the basket, and a water seal in communication with the seed collecting chamber through which the seeds pass, said seal preventing access of oxygen to the seed collecting chamber.

4. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therefrom, a seed collecting chamber disposed above the juice chamber and in communication with the upper end of the basket to receive the seeds discharged from the basket, a water seal in communication with the seed collecting chamber through which the seeds pass, said seal preventing access of oxygen to the seed collecting chamber, and a source of water to flush the seed collecting chamber.

5. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therethrough, and a seed collecting chamber disposed above the juice chamber and sealed therefrom adapted to receive the seeds discharged from the upper end of the basket.

6. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therethrough, a seed collecting chamber disposed above the juice chamber and sealed therefrom adapted to receive the seeds discharged from the upper end of the basket, and a water seal in communication with the seed collecting chamber for receiving the seeds, said seal preventing the access of oxygen to the seed collecting chamber.

7. An apparatus for treating fruit juices to prevent oxidation comprising an inverted frusto-conical basket, a plurality of apertures adjacent to the upper end of the basket, means to introduce juice into the lower end of the basket whereby the juice and seeds will move toward the upper end thereof, means to introduce an inert gas into the upper end of the basket to purge the air therefrom, a collection chamber surrounding the basket adjacent to the apertures for receiving the juice discharged therefrom, a seed collecting chamber disposed above the juice chamber and in communication with the upper end of the basket to receive the seeds discharged from the basket, means to prevent access of air into the seed chamber, and a conduit adjacent to the lower end of the basket for removing the inert gas which has passed therethrough.

RONALD B. McKINNIS.